(12) United States Patent
Walheim et al.

(10) Patent No.: US 11,664,998 B2
(45) Date of Patent: May 30, 2023

(54) INTELLIGENT HASHING OF SENSITIVE INFORMATION

(71) Applicant: International Business Machines Corporation, Armonk, NY (US)

(72) Inventors: Jon Walheim, San Francisco, CA (US); Girish Ratnam, Plano, TX (US); Thomas Jefferson Sandridge, Tampa, FL (US); Nicholas Bokun, Stratford, NJ (US); Jacob Thomas Covell, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 16/884,728

(22) Filed: May 27, 2020

(65) Prior Publication Data
US 2021/0377035 A1 Dec. 2, 2021

(51) Int. Cl.
*H04L 9/32* (2006.01)
*G06N 20/00* (2019.01)

(52) U.S. Cl.
CPC ........... *H04L 9/3236* (2013.01); *G06N 20/00* (2019.01)

(58) Field of Classification Search
CPC ..... H04L 9/3236; H04L 9/0643; G06N 20/00; G06F 21/6254; G06F 21/6245
See application file for complete search history.

(56) References Cited

U.S. PATENT DOCUMENTS

| | | |
|---|---|---|
| 8,561,185 B1 | 10/2013 | Muthusrinivasan et al. |
| 9,003,542 B1 | 4/2015 | MacKay et al. |
| 9,223,995 B1 | 12/2015 | Lavinio |
| 9,298,878 B2 | 3/2016 | Guirguis et al. |
| 9,582,680 B2 | 2/2017 | Bilodeau et al. |
| 9,881,178 B1* | 1/2018 | Brown ................ H04M 3/5183 |
| 10,102,398 B2 | 10/2018 | Neergaard |
| 10,380,380 B1* | 8/2019 | Abdi Taghi Abad ........................ G06F 16/907 |
| 10,468,026 B1* | 11/2019 | Newman ................. G10L 15/26 |

(Continued)

OTHER PUBLICATIONS

Sturdevant, M., "Build a real-time translation app that can listen and speak", Updated Feb. 8, 2020 | Published Feb. 7, 2020, 5 pages.

(Continued)

*Primary Examiner* — Matthew Smithers
(74) *Attorney, Agent, or Firm* — Stosch Sabo

(57) ABSTRACT

Described are techniques for preserving data security for sensitive information. The techniques including identifying sensitive information in first audio data from a first client device. The techniques further comprise generating second audio data including hashed sensitive information, where the hashed sensitive information comprises an audio clip that replaces the sensitive information and that is based on the sensitive information. The techniques further comprise transmitting the second data including the hashed sensitive information to a second client device. The techniques further comprise receiving third audio data including the hashed sensitive information from the second client device. The techniques further comprise generating fourth audio data by replacing the hashed sensitive information with the sensitive information and transmitting the fourth audio data including the sensitive information to the first client device.

20 Claims, 10 Drawing Sheets

(56) References Cited

U.S. PATENT DOCUMENTS

| | | | |
|---|---|---|---|
| 2010/0042583 A1 | 2/2010 | Gervais et al. | |
| 2011/0264631 A1 | 10/2011 | Sharma et al. | |
| 2012/0272329 A1 | 10/2012 | Grammer et al. | |
| 2015/0082449 A1 | 3/2015 | Mushkatblat | |
| 2016/0004873 A1* | 1/2016 | Bao | G06F 21/6254 |
| | | | 713/189 |
| 2016/0203319 A1* | 7/2016 | Coen | G06Q 30/0185 |
| | | | 726/25 |
| 2018/0137303 A1* | 5/2018 | Farkash | G06F 21/6263 |
| 2020/0050966 A1* | 2/2020 | Enuka | G06N 5/025 |
| 2020/0074108 A1* | 3/2020 | Fox | G06F 21/6245 |
| 2020/0125746 A1* | 4/2020 | Joshi | G06F 21/62 |

OTHER PUBLICATIONS

IBM, "Language Translator", printed May 13, 2020, 7 pages.
Reger, R., "Use Dynamic Data Masking to obfuscate your sensitive data", Jan. 25, 2016, 6 pages.
Chord et al., "Take charge of your data: using Cloud DLP to de-identify and obfuscate sensitive information", Nov. 20, 2018, 5 pages.
Unknown, "Dynamic Data Masking", SecuPi, printed May 13, 2020, 4 pages https://www.secupi.com/solution/dynamic-data-masking/.
Unknown, "Dynamic Data Masking", Informatica Data Sheet, 2019, 3 pages.
Mell et al., "The NIST Definition of Cloud Computing", Recommendations of the National Institute of Standards and Technology, Sep. 2011, 7 pages.

* cited by examiner

INTELLIGENT HASHING OF SENSITIVE INFORMATION

BACKGROUND

The present disclosure relates to data security, and, more specifically, to intelligently hashing sensitive information.

Various internal and/or external data security protocols can be utilized at the business unit, business, industry, government, and/or intergovernmental level for the purposes of preserving security and confidentiality of sensitive information. These protocols can include requirements related to locations where sensitive information is stored, limitations on who can access the sensitive information, protocols for how the information is accessed, protocols for destroying the sensitive information after its use, and/or other guidelines, best-practices, and/or requirements.

SUMMARY

Aspects of the present disclosure are directed toward a computer-implemented method comprising identifying sensitive information in first audio data from a first client device. The method further comprises generating second audio data including hashed sensitive information, where the hashed sensitive information comprises an audio clip that replaces the sensitive information and that is based on the sensitive information. The method further comprises transmitting the second data including the hashed sensitive information to a second client device. The method further comprises receiving third audio data including the hashed sensitive information from the second client device. The method further comprises generating fourth audio data by replacing the hashed sensitive information with the sensitive information. The method further comprises transmitting the fourth audio data including the sensitive information to the first client device.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
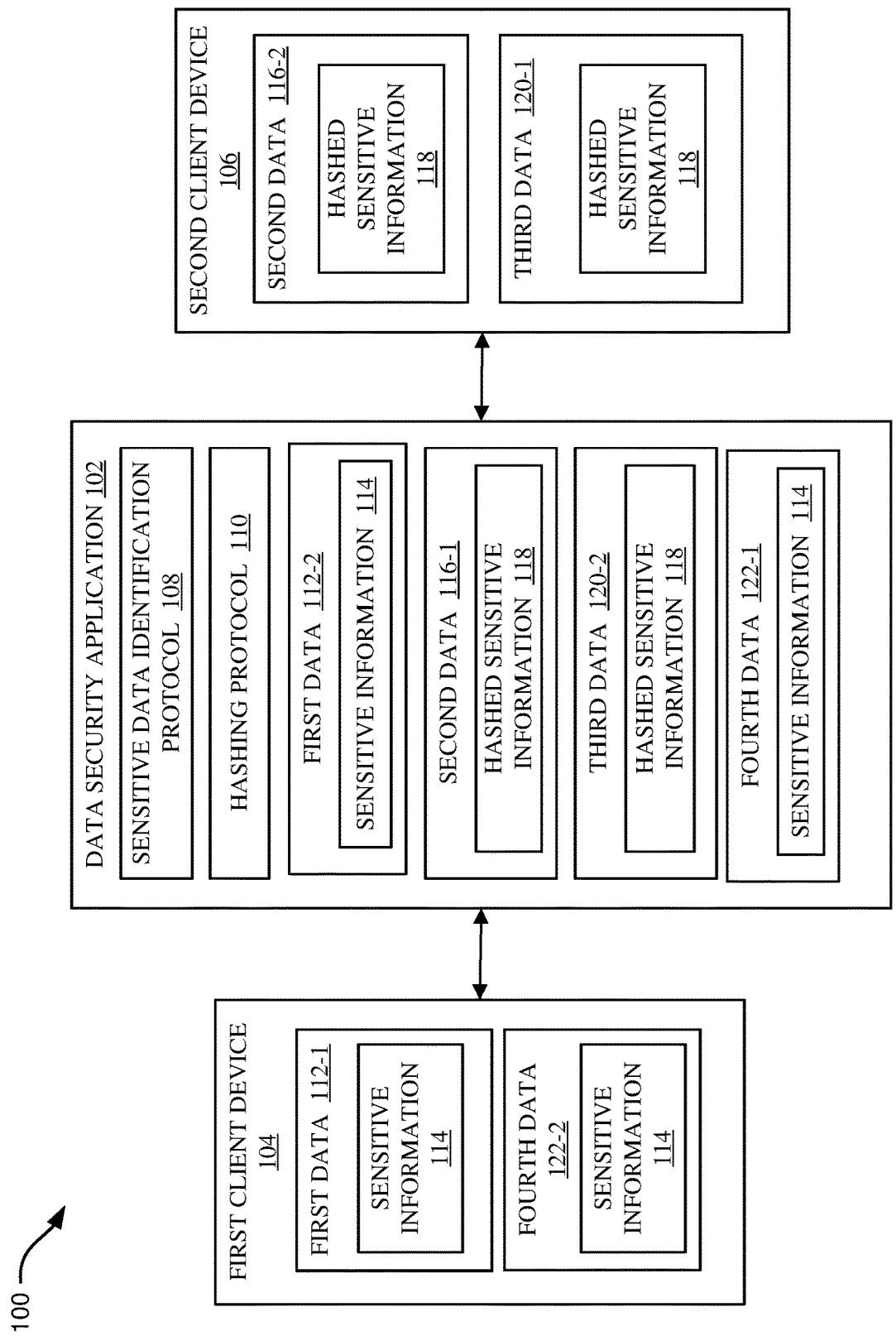
FIG. 1 illustrates a block diagram of an example computational environment, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data security, and, more specifically, to intelligently hashing sensitive information. While not limited to such applications, embodiments of the present disclosure may be better understood in light of the aforementioned context.

Aspects of the present disclosure relate to a mechanism for securely exchanging sensitive information, and any usage of aspects of the present disclosure can be disclosed to any users participating in the mechanism for securely exchanging information. Disclosure to users can include enabling the users to opt-in and/or opt-out of the mechanism for securely exchanging sensitive information. Furthermore, the users can be provided information related to how the mechanism for securely exchanging sensitive information is performed, what information may be collected, how the collected information may be used, and how any collected information is archived or destroyed after its use.

Sensitive information can include, but is not limited to, personally identifiable information (PII), personal information, personal data, private data, confidential information, and the like. Sensitive information can relate to identification (e.g., name, serial number, social security number, etc.), appearance (e.g., height, weight, ethnicity, gender, etc.), contact information (e.g., phone number, email address, physical address, etc.), relationships (e.g., spouse, children, parents, etc.), employment (e.g., employment status, employer(s), work address, work phone number, etc.), historical information (e.g., place of birth, maiden name, etc.), financial information (e.g., credit card information, tax return information), security information (e.g., passwords, passcodes, personal identification numbers (PINs), biometric data, etc.), health information (e.g., preexisting conditions, medications, historical or upcoming procedures, diagnostics, genetic markers, etc.), and/or other information that may be private, sensitive, and/or confidential. Sensitive information is handled in numerous business applications spanning a variety of industries such as, but not limited to, insurance applications, healthcare applications, financial services applications, supply chain applications, and/or service center applications.

Businesses that interact with sensitive information may be required to comply with internal and/or external protocols for data security. Example internal protocols may define who has access to what data (e.g., employee authorization levels), the environment in which any authorized personnel have access to the data (e.g., a secured office), the time in which any authorized personnel have access to the data (e.g., access allowed for a predetermined time window, etc.), and so on. Example external protocols can include protocols established by industries, localities, and/or governments for the purposes of protecting sensitive information of stakeholders, clients, citizens, and so on. Example external protocols include, but are not limited to, the General Data Protection Regulation (GDPR) and the Health Insurance Portability and Accountability Act (HIPAA).

One challenge associated with handling sensitive information relates to properly handling the sensitive information in an off-campus capacity such as a remote work, telework, and/or virtual work capacity where an employee is not located in a physical office of the business. In these situations, the business may not have the capability to monitor and/or enforce compliance with internal and/or external data security protocols at the remote work site. As a result, sensitive information may be compromised at the remote work site (e.g., by eavesdropping, etc.). Accordingly, there is a need for an application capable of enabling an employee to safely handle sensitive information in remote work environments with unclear data security conditions.

Aspects of the present disclosure remedy this challenge by providing a data security application capable of obfuscating sensitive information in textual and/or audio format between two or more parties in real-time. The obfuscated sensitive information can be obfuscated by hashing techniques. In some embodiments, the hashing techniques retain phonetic, syntactic, semantic, and/or other linguistic characteristics between the original data and the hashed data, thereby enabling a receiver of the hashed sensitive information to understand its context and appropriately utilize it for business purposes. In some embodiments, the data security application can be configured to hash and un-hash sensitive information, thereby enabling real-time, two-way communication of sensitive information.

As one representative example, in a phone call between a customer and an employee at a remote work site with ambiguous data security conditions, the employee may request the customer's address for purposes of completing a financial services application. The customer may say "123 State St." The data security application can identify the address as sensitive information, hash it to a contextually similar "585 West Ave.", and replace the portion of the audio containing the customer's real address with the hashed version of the customer's address. If the employee verbally confirms the hashed version of the customer's address back to the customer, the data security application can un-hash the hashed address and replace an audio clip of the employee reciting the hashed version of the customer's address with the un-hashed (e.g., original) version of the customer's address. Likewise, if the employee enters the hashed address into a business application, the business application can interface with the data security application to store the un-hashed version of the address (e.g., the customer's true address) in the business application. In this way, aspects of the present disclosure enable an employee to successfully perform business tasks requiring a customer's sensitive information without accessing the customer's sensitive information. Accordingly, aspects of the present disclosure can be useful for virtual work, telework, and/or remote work applications in a variety of industries and geographies that require employees to interact with sensitive information in environments with ambiguous data security conditions.

Referring now to the figures, FIG. 1 illustrates an example computational environment 100, in accordance with some embodiments of the present disclosure. The computational environment 100 includes a data security application 102 communicatively coupled to a first client device 104 and a second client device 106. The data security application 102 can be communicatively coupled to the first client device 104 and the second client device 106 by one or more permanent or intermittent networks. The networks can include wired networks, wireless networks, or a combination of the aforementioned. The networks can include cellular networks, short-range networks (e.g., a personal area network (PAN) such as Bluetooth®), wide-area network (WAN) (e.g., the Internet, an intranet, etc.), and/or any other network, now known or later developed.

The first client device 104 and the second client device 106 can be, but are not limited to, a laptop, a desktop, a tablet, a smartphone, a phone, and the like. The data security application 102 can reside in a server, a mainframe, a computer, a desktop, a laptop, or a client device such as first client device 104 and/or second client device 106. The data security application 102 can be configured to hash sensitive information conveyed from the first client device 104 to the second client device 106 in order to preserve the security and privacy of the conveyed sensitive information. Likewise, the data security application 102 can be configured to un-hash any hashed sensitive information conveyed from the second client device 106 back to the first client device 104. In this way, the data security application 102 can enable the communication of sensitive information between the first client device 104 and the second client device 106 without compromising the security and/or privacy of the sensitive information.

In order the achieve the above, the data security application 102 can include a sensitive data identification protocol 108 for identifying sensitive information and a hashing protocol 110 for hashing any identified sensitive information. These aspects of the data security application 102 are discussed in more detail hereinafter with respect to FIG. 2.

The first client device 104 can generate first data 112-1 including sensitive information 114. The first data 112-1 can be audio data and/or textual data. The first client device 104 can transmit the first data 112-1 to the second client device 106, however, prior to reaching the second client device 106, the first data 112-1 can be routed through the data security application 102 and stored as first data 112-2. The first data 112-2 can be evaluated according to the sensitive data identification protocol 108. The sensitive data identification protocol 108 can be configured to identify the sensitive information 114 in the first data 112-2. The sensitive data identification protocol 108 can utilize natural language processing (NLP) and/or natural language understanding (NLU) to extract content from textual and/or audio data in the first data 112-2. The sensitive data identification protocol 108 can compare the extracted content to a database to determine if the extracted content includes features matching a feature set in the database indicating sensitive information. Alternatively, or in addition, aspects of the present disclosure can input the extracted content into a trained machine learning model such as a sensitivity score model configured to generate a score indicative of the level of sensitive information and/or the likelihood of sensitive information existing in the extracted content. If a match in the database indicates sensitive information, or if the sensitivity score indicates sensitive information, then the data security application 102 can tag the extracted content as the sensitive information 114 and provide the identified sensitive information 114 to the hashing protocol 110.

The hashing protocol 110 can be configured to hash the sensitive information 114. The hashing protocol 110 can utilize any hashing technique now known or later developed. The hashing protocol 110 can be, but is not limited to, the Secure Hash Algorithm (SHA) family of hashing algorithms (e.g., SHA-1, SHA-2, SHA-3, etc.), MD5 hashing algorithms, cyclic redundancy check (CRC) hashing algorithms (e.g., CRC32), Research and Development in Advanced Communications Technologies in Europe (RACE) Integrity Primitives Evaluation Message Digest (RIPEMD) hashing algorithms, Advanced Encryption Standard (AES) hashing algorithms, Rivest-Shamir-Adleman (RSA) hashing algorithms, and so on. More generally, the hashing protocol 110 can refer to any family of hashing functions such as, but not limited to, an identity hash function, a folding hash function, a mid-squares hash function, a division hash function, an algebraic hash function, a unique permutation hash function, a multiplicative hash function, a Fibonacci hash function, a Zobrist hash function, a customized hash function, or a combination of two or more of the aforementioned hash functions.

When utilizing a customized hash function, the customized hash function need not necessarily output a traditional fixed-length, integer-based code, but it may instead generate a hashed output that mimics the form, context, phonetic characteristics, syntactic characteristics, semantic characteristics, and/or other linguistic characteristics of the sensitive information 114. For example, if the sensitive information is an address such as 123 Mulberry Court, the hashing protocol 110 can be configured to output an alternative address such as 582 $7^{th}$ Avenue. In this way, the form of the output from the hashing protocol 110 can be similar to the form of the sensitive information 114 so that a receiver of the sensitive information can properly identify the hashed sensitive information as an address even though it is modified from its original version.

As another example utilizing a customized hash function, for any certain type of sensitive information, the hashing protocol 110 can have a static hash conversion mechanism. For example, any identified address can be statically converted to 123 Some St. As another example, any phone number can be statically converted to (111)111-1111. Furthermore, the hashing protocol 110 can be configured to hash sensitive information once, or, in other embodiments, dynamically hash the sensitive information multiple times, where the sensitive information is re-hashed whenever it is retransmitted to another client device.

In some embodiments, the data security application 102 is configured to identify any hashed sensitive information 118 such as, for example, by highlighting it, by adding an audio tone or audio explanation indicating the existence of the hashed sensitive information 118, and so on. In some embodiments, the data security application 102 further provides an explanation for why the hashed sensitive information 118 is classified as sensitive information 114. The explanation can be based on the sensitive data identification protocol 108. The explanation can include, for example, information related to a match in a sensitive information database, a sensitivity score from a sensitivity score model above a sensitivity score threshold, and the like.

After inputting the sensitive information 114 to the hashing protocol 110, the hashing protocol 110 can output hashed sensitive information 118 which can be stored in second data 116-1. The second data 116-1 can include the data in first data 112-2 that is not classified as sensitive information while replacing the portions classified as sensitive information 114 with the hashed sensitive information 118.

The data security application 102 can transmit the second data 116-1 to the second client device 106 where it can be stored as second data 116-2. The second client device 106 can review the second data 116-2. In some embodiments, the second client device 106 receives input from a user including the hashed sensitive information 118 such as, for example, an employee associated with the second client device 106 confirming an address of a customer associated with the first client device 104, where the address is provided to the second client device 106 as the hashed sensitive information 118. In doing so, the second client device 106 can generate third data 120-1 including the hashed sensitive information 118 and transmit the third data 120-1 to the first client device 104. The third data 120-1 can be routed through the data security application 102 and stored as third data 120-2. The data security application 102 can consult a mapping table associated with the hashing protocol 110 to determine that the hashed sensitive information 118 matches an entry in the mapping table. The data security application 102 can then replace the hashed sensitive information 118 with its corresponding sensitive information 114 and generate fourth data 122-1 by replacing the hashed sensitive information 118 with the sensitive information 114 and retaining any data in third data 120-2 that is not determined to be hashed sensitive information 118. The data security application 102 can then transmit the fourth data 122-1 to the first client device 104 where it can be stored as fourth data 122-2.

As previously discussed, the data transmitted between the first client device 104, the data security application 102, and the second client device 106 can be textural data and/or audio data. Advantageously, aspects of the present disclosure are configured to perform the identification and hashing of sensitive information in real time so that aspects of the present disclosure can be implemented during, for example, a phone conversation or an instant messaging conversation between parties exchanging sensitive information. In order to better illustrate the functionality of FIG. 1, a non-limiting example is provided below.

An employee works with a customer using a business application involving sensitive information (e.g., an insurance application, a healthcare application, a financial services application, a supply chain application, a call center application, etc.). The employee typically works in a dedicated office that is configured to ensure data privacy, data confidentiality, and/or data security. However, the employee is teleworking and is unable to provide the same level of security in their virtual office. Accordingly, the employee's company can utilize the data security application 102 to provide sufficient data security for interactions with customers involving sensitive information. The data security application 102 can be downloaded to the employee's device (e.g., second client device 106), associated with a server that routes traffic to and/or from the employee's device, and/or otherwise associated with the employee's device.

The employee can login to their second client device 106 using standard authentication credentials such as, but not limited to, a login, a password, a personal identification number (PIN), a physical dongle with an associated login token, a biometric authentication (e.g., fingerprint, facial recognition, voice recognition, iris recognition, etc.), and so on. The employee can also establish other standard data security protocols such as a Virtual Private Network (VPN).

The employee can then use the employee's second client device 106 to interact with a customer using the customer's first client device 104. For example, the interaction can be a phone call between a customer's first client device 104 (e.g., a smartphone) and the employee's second client device 106 (e.g., a laptop configured to make and receive phone calls). The interaction can involve sensitive information such as a discussion regarding an insurance claim, an insurance application, a mortgage application, a credit card application, a healthcare billing issue, a health issue, the recovery of a lost password, and the like.

The employee may be required to confirm the customer's identity by requesting a social security number and/or an address. In this case, the customer may state "it's 123-45-6789" in response to the employee's question regarding the customer's social security number. This information (e.g., first data 112-1) can be routed through data security application 102 where it is provided to the sensitive data identification protocol 108. The sensitive data identification protocol 108 can identify "123-45-6789" as sensitive information 114. Once identified, the data security application 102 can send the sensitive information 114 to the hashing protocol 110. The hashing protocol 110 can hash the sensitive information 114. In some embodiments, the hashing protocol 110 hashes the sensitive information 114 into a contextually, syntactically, semantically, phonetically, and/or linguistically similar format. For example, the hashed sensitive information 118 can be "888-57-2569". The data security application 102 can then transmit this information (e.g., second data 116-1) to the employee's second client device 106 such that the employee hears "it's 888-57-2569" where the hashed sensitive information 118 can be converted to audio data using NLP and/or NLU. The employee can enter this information into the business application (e.g., mortgage application software, etc.) that can be communicatively coupled to the data security application 102 so that, for example, if the employee enters the social security number as "888-57-2569" on the second client device 106, that information can be routed through the data security application 102, un-hashed, and securely stored as "123-45-6789." Likewise, if the employee repeats back the social security number to confirm it with the customer, the employee may say, "please confirm that your social security number is 888-57-2569" (e.g., third data 120-1). In the reverse order, this data can be routed through the data security application 102 where the hashed sensitive information 118 (e.g., 888-57-2569) is matched to an entry in a mapping table associated with the hashing protocol 110. The data security application 102 can replace the matched hashed sensitive information 118 with its corresponding sensitive information 114, and transmit this updated information (e.g., fourth data 122-1) to the first client device 104 so that the customer hears "please confirm that your social security number is 123-45-6789."

Although social security numbers are discussed above, the above example is equally relevant to any type of sensitive information such as, for example, addresses, names, security question answers, passwords, and other sensitive information which may benefit from two-way, real-time hashing of the sensitive information using the data security application 102.

Figure 2:
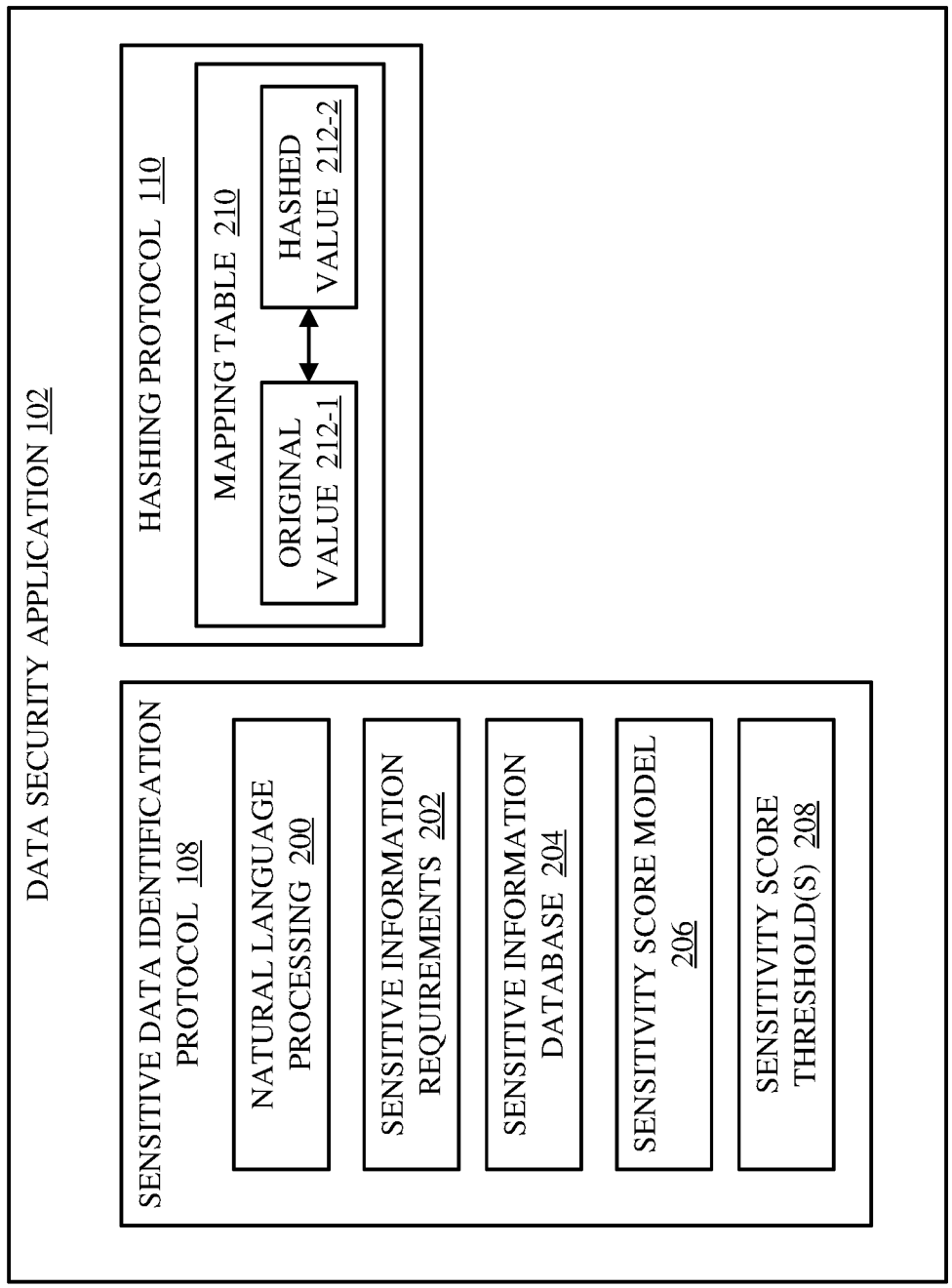
FIG. 2 illustrates a block diagram of an example data security application, in accordance with some embodiments of the present disclosure.

Referring now to FIG. 2, illustrated is a block diagram of an example data security application 102, in accordance with some embodiments of the present disclosure. The data security application 102 includes the sensitive data identification protocol 108 and the hashing protocol 110 as previously discussed. The sensitive data identification protocol 108 includes natural language processing 200. Natural language processing 200 can refer to any NLP and/or NLU techniques now known or later developed such as, for example, grammar induction, lemmatization, morphological segmentation, part-of-speech tagging, parsing, sentence boundary disambiguation, stemming, word segmentation, terminology extraction, lexical semantics, distributional semantics, machine translation, named entity recognition (NER), natural language generation, optical character recognition (OCR), question answering, textual entailment, relationship extraction, sentiment analysis, topic segmentation, word sense disambiguation, speech recognition, speech segmentation, text-to-speech conversion, speech-to-text conversion, and the like.

Sensitive data identification protocol 108 can further include sensitive information requirements 202 such as internal and/or external data integrity, security, privacy, and/or confidentiality protocols. For example, the sensitive information requirements 202 can include external protocols such as the GDPR, HIPAA, and/or others. Likewise, the sensitive information requirements 202 can include internal protocols such as protocols related to Service Level Agreements (SLAs), data handling best practices, and the like.

The sensitive data identification protocol 108 can further include a sensitive information database 204 that includes identifying features of sensitive information. For example, the sensitive information database 204 can include a record indicating that numeric data in the format of "XXX-XX-XXXX" is a social security number and is sensitive information. Similarly, the sensitive information database 204 can identify any extracted content including a number and followed by any one of "street," "st.," "avenue," "ave.," "court," "ct.," "road," or "rd." within a predetermined number of subsequent words as an address. Accordingly, if any extracted content matches one or more entries in the sensitive information database 204, it can be classified as sensitive information 114.

The sensitive data identification protocol 108 further includes a sensitivity score model 206. In some embodiments, the sensitivity score model 206 can utilize any NLP, NLU, and/or machine learning techniques to generate a model capable of classifying data as sensitive information even if it does not match any entries in the sensitive information database 204. For example, the sensitivity score model 206 can use a bag-of-words model based on the sensitive information requirements 202 and/or the sensitive information database 204 such that if any extracted content includes a predetermined number of words in the bag-of-words model above a threshold frequency, that extracted content can be classified as sensitive information 114.

In some embodiments, the sensitivity score model 206 can include any number of machine learning algorithms such as, but not limited to, NLP, NLU, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, sensitivity score model 206 can be configured to perform machine learning on a training set of historical data including sensitive information using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training the sensitivity score model 206 on a training set of historical data including sensitive information, the sensitivity score model 206 can ingest extracted portions of textual and/or audio data (e.g., first data 112-1) and generate sensitivity scores for each of the extracted portions of textual and/or audio data, where the sensitivity scores can indicate a likelihood or degree of sensitive information in the corresponding extracted portions of the textual and/or audio data.

The sensitive data identification protocol 108 can further comprise sensitivity score thresholds 208 that can be used to classify extracted content having a sensitivity score from the sensitivity score model 206 as sensitive information or not sensitive information. For example, for an extracted portion of data associated with a sensitivity score from the sensitivity score model 206 that is above the sensitivity score threshold 208, that extracted portion of data can be classified as sensitive information 114.

In some embodiments, feedback can be received regarding the accuracy of extracted content classified as sensitive information 114. As a result of the feedback, one or more aspects of the sensitive data identification protocol 108 can be updated. For example, records can be added to the sensitive information database 204 classifying new types or new formats of sensitive information 114. As another example, parameters associated with the sensitivity score model 206 can be modified to alter the sensitivity scores generated by the sensitivity score model 206. As yet another example, the sensitivity score thresholds 208 can be modified.

Any sensitive information 114 identified by the sensitive data identification protocol 108 can be provided to the hashing protocol 110. The hashing protocol 110 can include a mapping table 210 storing, for each original value 212-1, a correspondence to a hashed value 212-2. In this way, the data security application 102 can enable two-way communication between two or more client devices without the sensitive information 114 ever being disclosed to the party receiving the sensitive information 114. Furthermore, the mapping table 210 enables un-hashing of the hashed sensitive information 118. Said another way, hashing protocols can traditionally be one-way operations such that original data cannot be reconstructed from its hashed value. However, by maintaining a mapping table 210, aspects of the present disclosure can correlate hashed values 212-2 with their corresponding original values 212-1 in order to enable un-hashing of the hashed values 212-2.

Figure 3:
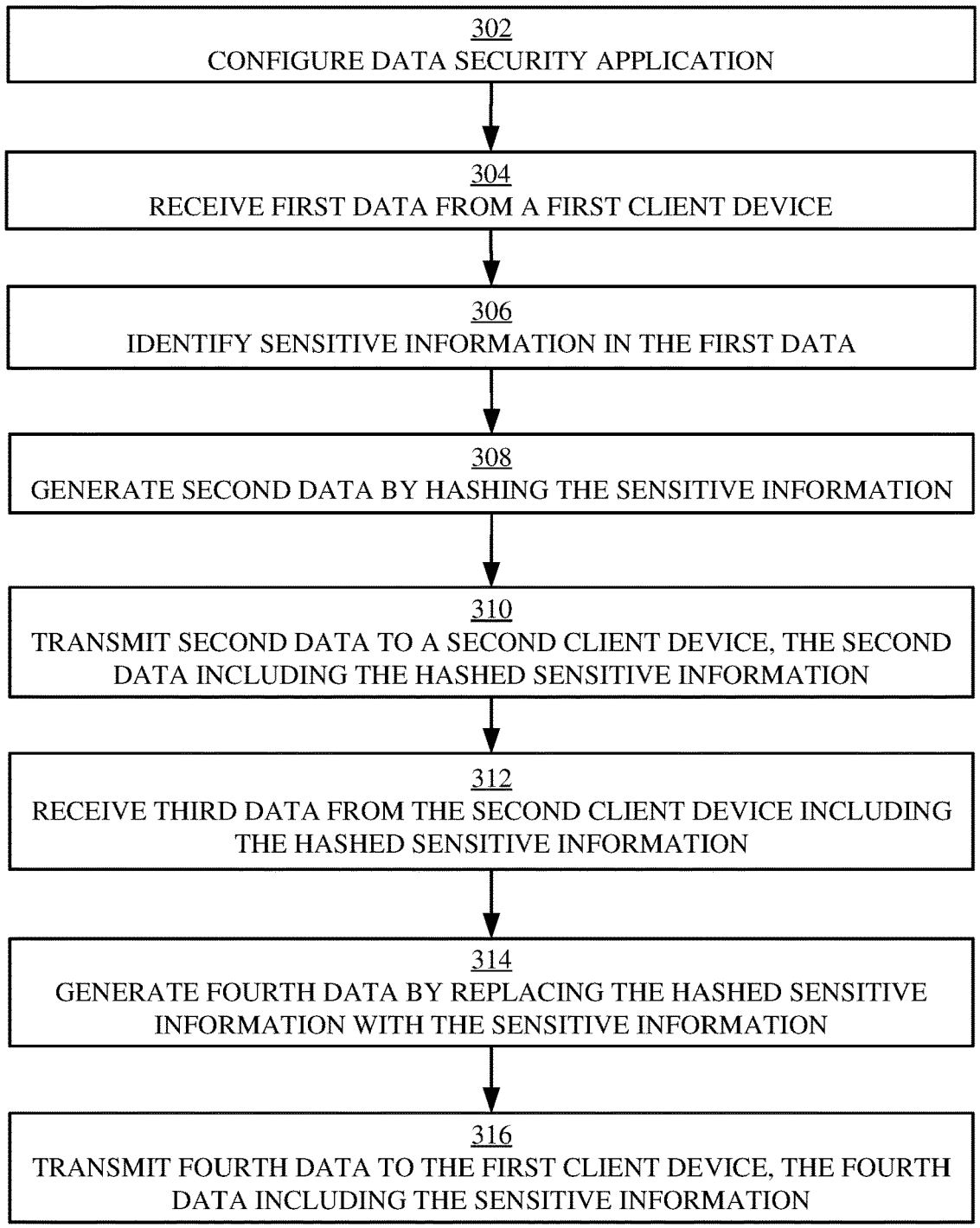
FIG. 3 illustrates a flowchart of an example method for preserving data security of sensitive information using a data security application, in accordance with some embodiments of the present disclosure.

Referring now to FIG. 3, illustrated is a flowchart of an example method 300 for preserving data security of sensitive information 114 using a data security application 102, in accordance with some embodiments of the present disclosure. In some embodiments, the method 300 is implemented by the data security application 102, a computer, a processor, or another configuration of hardware and/or software.

Operation 302 includes configuring the data security application 102. In some embodiments, operation 302 includes one or more client devices opting into, downloading, and/or executing the data security application 102. In some embodiments, operation 302 includes defining sensitive information requirements 202, generating, downloading, or configuring access to a sensitive information database 204, generating, downloading, or configuring access to a sensitivity score model 206, and/or defining sensitivity score thresholds 208. Operation 302 is discussed in more detail hereinafter with respect to FIG. 4.

Operation 304 includes receiving first data 112-1 from a first client device 104 and storing the received data as first data 112-2 in the data security application 102. Operation 306 includes identifying sensitive information 114 in the first data 112-2. In some embodiments, the sensitive information 114 is identified according to a sensitive data identification protocol 108. Operation 306 is discussed in further detail hereinafter with respect to FIG. 5.

Operation 308 includes generating second data 116-1 by hashing the sensitive information 114 to generate hashed sensitive information 118. Operation 310 includes transmitting the second data 116-1 to a second client device 106, where the second data 116-1 includes the hashed sensitive information 118. In some embodiments, the transmitted data can be stored as second data 116-2 at the second client device 106.

Operation 312 includes receiving third data 120-1 from the second client device 106 and storing the received data as third data 120-2 in the data security application 120. In some embodiments, the third data 120-2 can include the hashed sensitive information 118.

Operation 314 includes generating fourth data 122-1 by replacing the hashed sensitive information 118 in the third data 120-2 with the sensitive information 114. In some embodiments, operation 314 consults a mapping table 210 in order to match the hashed sensitive information 118 to an entry in the mapping table 210 and replace the hashed sensitive information 118 with a corresponding sensitive information 114 from the entry in the mapping table 210. Operation 314 is discussed in more detail hereinafter with respect to FIG. 6.

Operation 316 includes transmitting the fourth data 122-1 to the first client device 104, where the fourth data 122-1 includes the sensitive information 114. In some embodiments, the first client device 104 can store the received data as fourth data 122-2.

Figure 4:
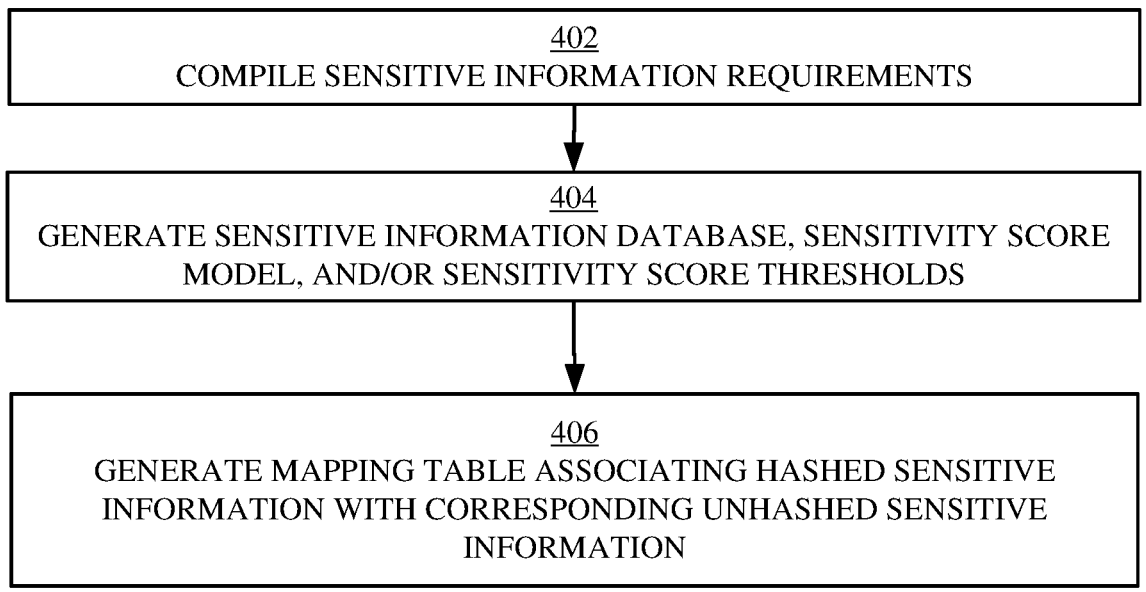
FIG. 4 illustrates a flowchart of an example method for configuring a data security application, in accordance with some embodiments of the present disclosure.

Referring now to FIG. 4, illustrated is a flowchart of an example method 400 for configuring a data security application 102, in accordance with some embodiments of the present disclosure. In some embodiments, the method 400 is implemented by the data security application 102, a computer, a processor, or another configuration of hardware and/or software. In some embodiments, the method 400 is a sub-method of operation 302 of FIG. 3.

Operation 402 includes compiling sensitive information requirements 202. The sensitive information requirements 202 can include external and/or internal protocols for handling sensitive information such as, but not limited to, confidential information, personally identifiable information, personal information, private information, and the like.

Operation 404 includes generating a sensitive information database 204, a sensitivity score model 206, and/or sensitivity score threshold(s) 208. Operation 404 can refer to creating, defining, downloading, and/or configuring access to any of the sensitive information database 204, the sensitivity score model 206, and/or the sensitivity score threshold(s) 208. For example, in some embodiments, operation 404 includes training the sensitivity score model 206 using historical data, and, if necessary, tuning one or more parameters associated with the sensitivity score model 206. In some embodiments, one or more of the sensitive information database 204, the sensitivity score model 206, and/or the sensitivity score threshold(s) 208 are based on the sensitive information requirements 202 that were compiled in operation 402.

Operation 406 includes generating a mapping table 210 for the purposes of associated hashing sensitive information 118 (e.g., hashed value 212-2) with corresponding un-hashed sensitive information 114 (e.g., original value 212-1). For example, in some embodiments, operation 406 includes defining a storage location for the mapping table 210, where the storage location exhibits a high degree of security such as, for example, an encryption scheme, access controls, a firewall, a dedicated intrusion detection system, and so on.

Figure 5:
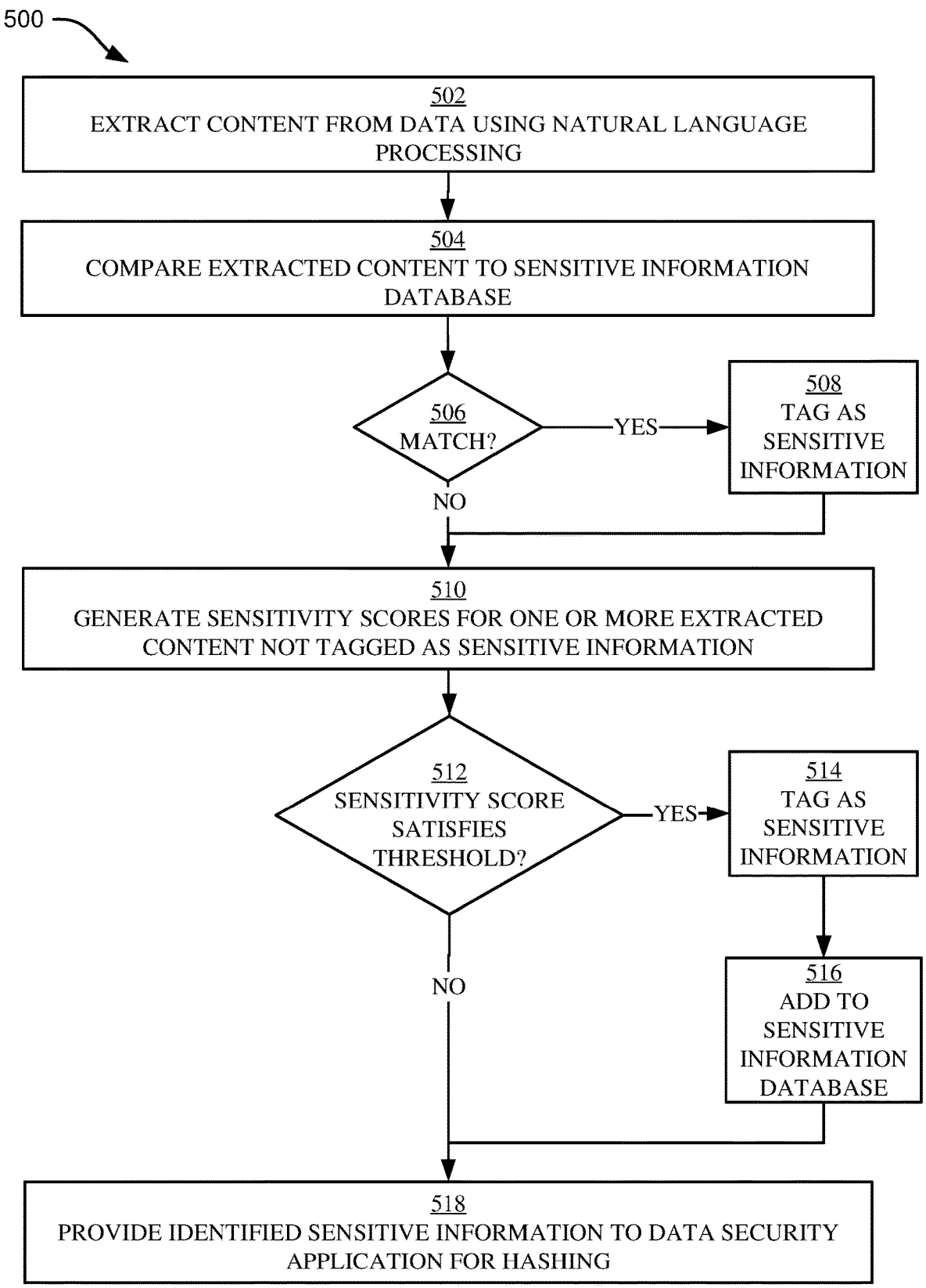
FIG. 5 illustrates a flowchart of an example method for detecting sensitive information, in accordance with some embodiments of the present disclosure.

Referring now to FIG. 5, illustrated is a flowchart of an example method 500 for detecting sensitive information 114, in accordance with some embodiments of the present disclosure. In some embodiments, the method 500 is implemented by the data security application 102, a computer, a processor, or another configuration of hardware and/or software. In some embodiments, the method 500 is a sub-method of operation 306 of FIG. 3.

Operation 502 includes extracting content from received data (e.g., first data 112-2) using NLP and/or NLU techniques. The extracted content can comprise one or more characters (e.g., alphabetical, numeric, alphanumeric, and/or symbolic characters), one or more words, and/or one or more phrases according to various embodiments. Operation 504 includes comparing the extracted content to the sensitive information database 204. Operation 506 includes determining if there is a match between any of the portions of extracted content and any of the records in the sensitive information database 204. If so (506: YES), the method 500 proceeds to operation 508 where it tags the relevant portion(s) of extracted content as sensitive information 114. The method 500 then proceeds to operation 510. If not (506: NO), the method 500 proceeds to operation 510.

Operation 510 includes generating sensitivity scores for one or more portions of extracted content that are not tagged as sensitive information 114. In some embodiments, operation 510 generates the sensitivity scores by inputting the portions of extracted content into the sensitivity score model 206. In some embodiments, operation 510 generates sensitivity scores for each portion of extracted content that was not tagged as sensitivity information in operation 508. Advantageously, generating sensitivity scores for portions of extracted content not otherwise tagged as sensitive information 114 can improve accuracy in identifying sensitive information 114 insofar as operation 510 provides a second, alternative method to identifying sensitive information 114.

Operation 512 includes determining if any of the sensitivity scores satisfy a sensitivity score threshold 208. If so (512: YES), the method 500 proceeds to operation 514 and tags the relevant portions of extracted content associated with a sensitivity score satisfying the sensitivity score threshold 208 as sensitive information 114. The method 500 then proceeds to operation 516 and adds the portions of extracted content tagged as sensitivity information 114 in operation 514 to the sensitive information database 204. Advantageously, adding newly discovered sensitive information 114 to the sensitive information database 204 improves processing efficiency of the data security application 102 insofar as database lookups can be faster and less computationally expensive compared to generating scores using the sensitivity score model 206. The method 500 then proceeds to operation 518.

Returning again to operation 512, if none of the sensitivity scores satisfy the sensitivity score threshold 208, then the method 500 proceeds to operation 518. Operation 518 includes providing any identified sensitive information 114 to the data security application 102 for hashing.

Figure 6:
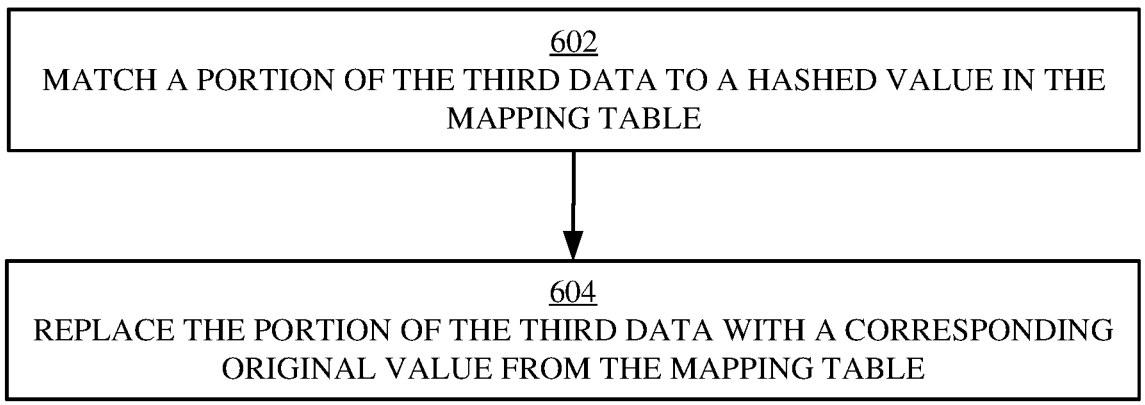
FIG. 6 illustrates a flowchart of an example method for replacing hashed sensitive information with sensitive information, in accordance with some embodiments of the present disclosure.

Referring now to FIG. 6, illustrated is a flowchart of an example method 600 for replacing hashed sensitive information 118 with sensitive information 114, in accordance with some embodiments of the present disclosure. In some embodiments, the method 600 is implemented by the data security application 102, a computer, a processor, or another configuration of hardware and/or software. In some embodiments, the method 600 is a sub-method of operation 314 of FIG. 3.

Operation 602 includes matching a portion of the third data 120-2 to a hashed value 212-2 in the mapping table 210. Operation 604 includes replacing the portion of the third data 120-2 with the corresponding original value 212-1 from the mapping table 210. Advantageously, the method 600 enables un-hashing of previously hashed information, thereby enabling two-way communication of sensitive information 114 without ever disclosing the sensitive information 114 to the original receiving party.

Figure 7A:
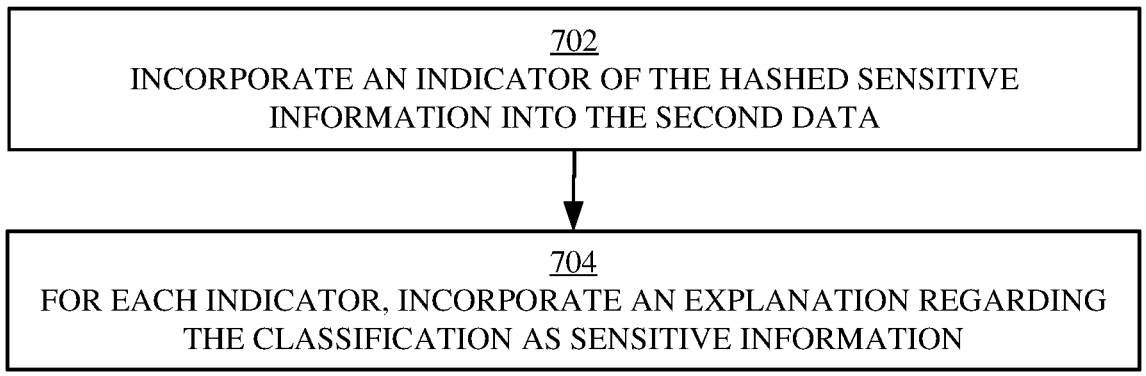
FIG. 7A illustrates a flowchart of an example method for incorporating indications into the hashed sensitive information, in accordance with some embodiments of the present disclosure.

Referring now to FIG. 7A, illustrated is a flowchart of an example method 700 for incorporating indications into the hashed sensitive information 118, in accordance with some embodiments of the present disclosure. In some embodiments, the method 700 is implemented by the data security application 102, a computer, a processor, or another configuration of hardware and/or software. In some embodiments, the method 700 is a sub-method of operation 308 of FIG. 3.

Operation 702 includes incorporating an indicator of the hashed sensitive information 118 into the second data 116-1. In some embodiments, the indicator comprises highlighting, boldening, underlining, appending with an asterisk, or otherwise differentiating text associated with the sensitive information 118. In other embodiments, the indicator comprises an audio tone, a predetermined audio clip, or another audio indicator associated with the second data 116-1 indicating the existence of the hashed sensitive information 118. For example, where the second data 116-1 is audio data, a tone can be inserted before and after the hashed sensitive information 118. As another example, where the second data 116-1 is audio data and the sensitive information 114 is a social security number, an audio clip can be appended to the second data 116-1 stating "any social security numbers are altered for the security, privacy, and safety of our customers" or another audio clip indicating the existence of the hashed sensitive information 118.

Operation 704 includes, for each indicator, incorporating an explanation regarding the classification of the sensitive information 114 as sensitive information. For example, operation 704 can reference a match in the sensitive information database 204. As another example, operation 704 can reference a sensitivity score generated by the sensitivity score model 206 above the sensitivity score threshold 208.

Figure 7B:
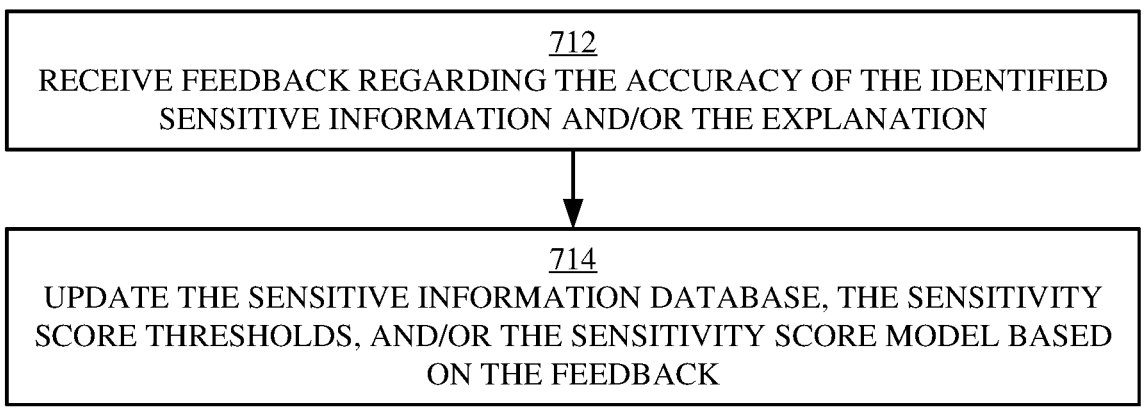
FIG. 7B illustrates a flowchart of an example method for incorporating feedback into the data security application, in accordance with some embodiments of the present disclosure.

Referring now to FIG. 7B, illustrated is a flowchart of an example method 710 for incorporating feedback into the data security application 102, in accordance with some embodiments of the present disclosure. In some embodiments, the method 710 is implemented by the data security application 102, a computer, a processor, or another configuration of hardware and/or software. In some embodiments, the method 710 is a sub-method of operation 312 of FIG. 3.

Operation 712 includes receiving feedback regarding the accuracy of the identified hashed sensitive information 118 and/or the explanation associated with the hashed sensitive information 118. For example, the feedback may involve a user of the second client device 106 confirming that the identified hashed sensitive information 118 is, in fact, sensitive information, or the feedback can indicate the that identified hashed sensitive information 118 should not have been classified as sensitive information. In some embodiments, the feedback can include a more detailed reasoning related to the indications and/or the explanations of sensitive information.

Operation 714 includes updating the sensitive information database 204, the sensitivity score model 206, and/or the sensitivity score thresholds 208 based on the feedback. For example, in order to decrease false positives based on the feedback, operation 714 can increase the sensitivity score threshold 208. As another example, in order to decrease false negatives based on the feedback, operation 714 can skew the training data associated with the sensitivity score model 206 in order to have a more balanced representation of sensitive information and not sensitive information in the training data.

Figure 8:
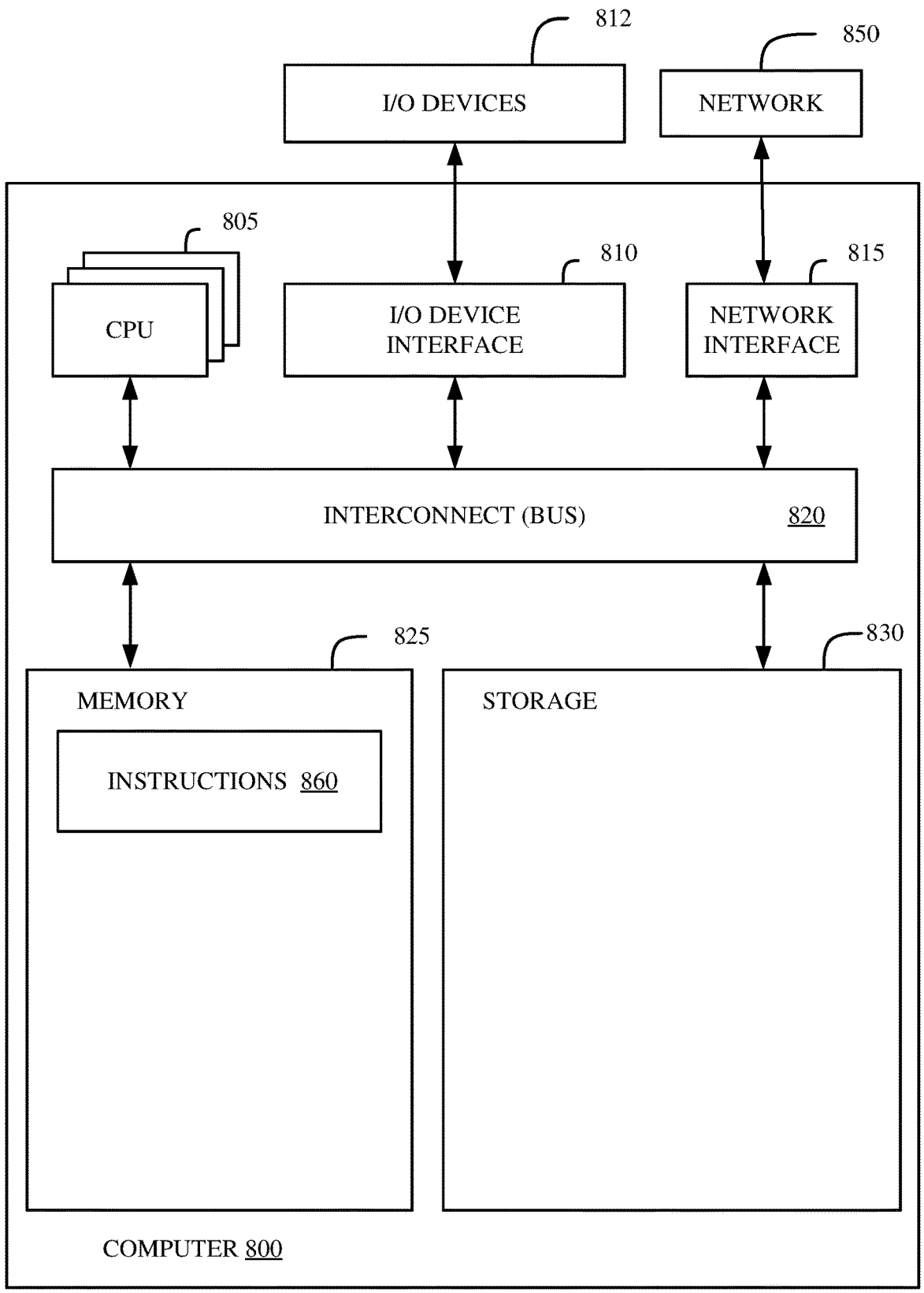
FIG. 8 illustrates a block diagram of an example computer, in accordance with some embodiments of the present disclosure.

FIG. 8 illustrates a block diagram of an example computer 800 in accordance with some embodiments of the present disclosure. In various embodiments, computer 800 can perform any or all of the methods described in FIGS. 3-7 and/or implement the functionality discussed in any one of FIGS. 1-2. In some embodiments, computer 800 receives instructions related to the aforementioned methods and functionalities by downloading processor-executable instructions from a remote data processing system via network 850. In other embodiments, computer 800 provides instructions for the aforementioned methods and/or functionalities to a client machine such that the client machine executes the method, or a portion of the method, based on the instructions provided by computer 800. In some embodiments, the computer 800 is incorporated into (or functionality similar to computer 800 is virtually provisioned to) the data security application 102 of FIG. 1, other aspects of the computational environment 100 of FIG. 1, or another aspect of the present disclosure.

Computer 800 includes memory 825, storage 830, interconnect 820 (e.g., BUS), one or more CPUs 805 (also referred to as processors herein), I/O device interface 810, I/O devices 812, and network interface 815.

Each CPU 805 retrieves and executes programming instructions stored in memory 825 or storage 830. Interconnect 820 is used to move data, such as programming instructions, between the CPUs 805, I/O device interface 810, storage 830, network interface 815, and memory 825. Interconnect 820 can be implemented using one or more busses. CPUs 805 can be a single CPU, multiple CPUs, or a single CPU having multiple processing cores in various embodiments. In some embodiments, CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random-access memory (e.g., static random-access memory (SRAM), dynamic random access memory (DRAM), or Flash). Storage 830 is generally included to be representative of a non-volatile memory, such as a hard disk drive, solid state device (SSD), removable memory cards, optical storage, or flash memory devices. In an alternative embodiment, storage 830 can be replaced by storage area-network (SAN) devices, the cloud, or other devices connected to computer 800 via I/O device interface 810 or network 850 via network interface 815.

In some embodiments, memory 825 stores instructions 860. However, in various embodiments, instructions 860 are stored partially in memory 825 and partially in storage 830, or they are stored entirely in memory 825 or entirely in storage 830, or they are accessed over network 850 via network interface 815.

Instructions 860 can be computer-readable and computer-executable instructions for performing any portion of, or all of, the methods of FIGS. 3-7 and/or implementing the functionality discussed in FIGS. 1-2. In some embodiments, instructions 860 can be referred to as a sensitive information masking protocol, sensitive information masking instructions, and/or a sensitive information masking mechanism. Although instructions 860 are shown in memory 825, instructions 860 can include program instructions collectively stored across numerous computer-readable storage media and executable by one or more CPUs 805.

In various embodiments, I/O devices 812 include an interface capable of presenting information and receiving input. For example, I/O devices 812 can present information to a user interacting with computer 800 and receive input from the user.

Computer 800 is connected to network 850 via network interface 815. Network 850 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
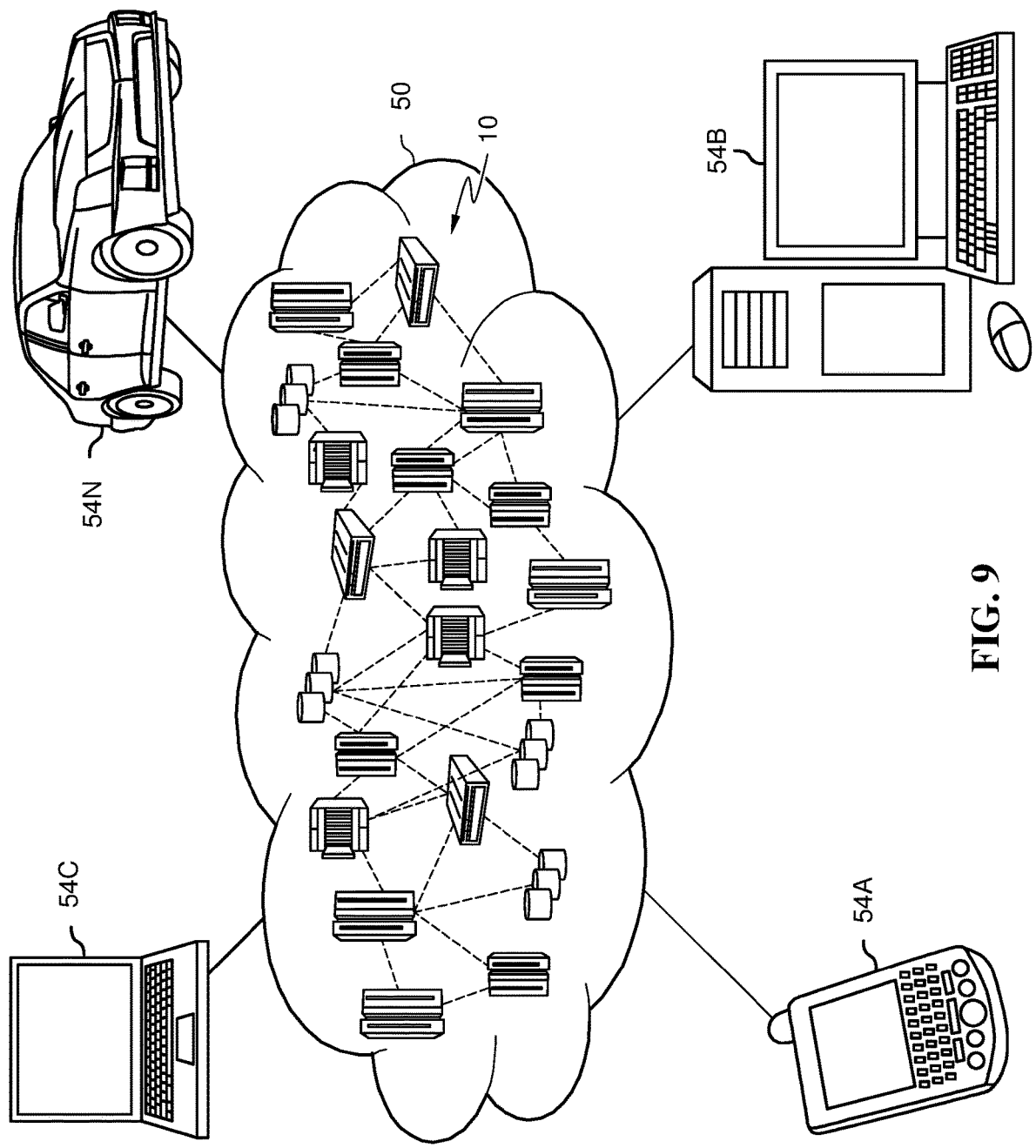
FIG. 9 depicts a cloud computing environment, in accordance with some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
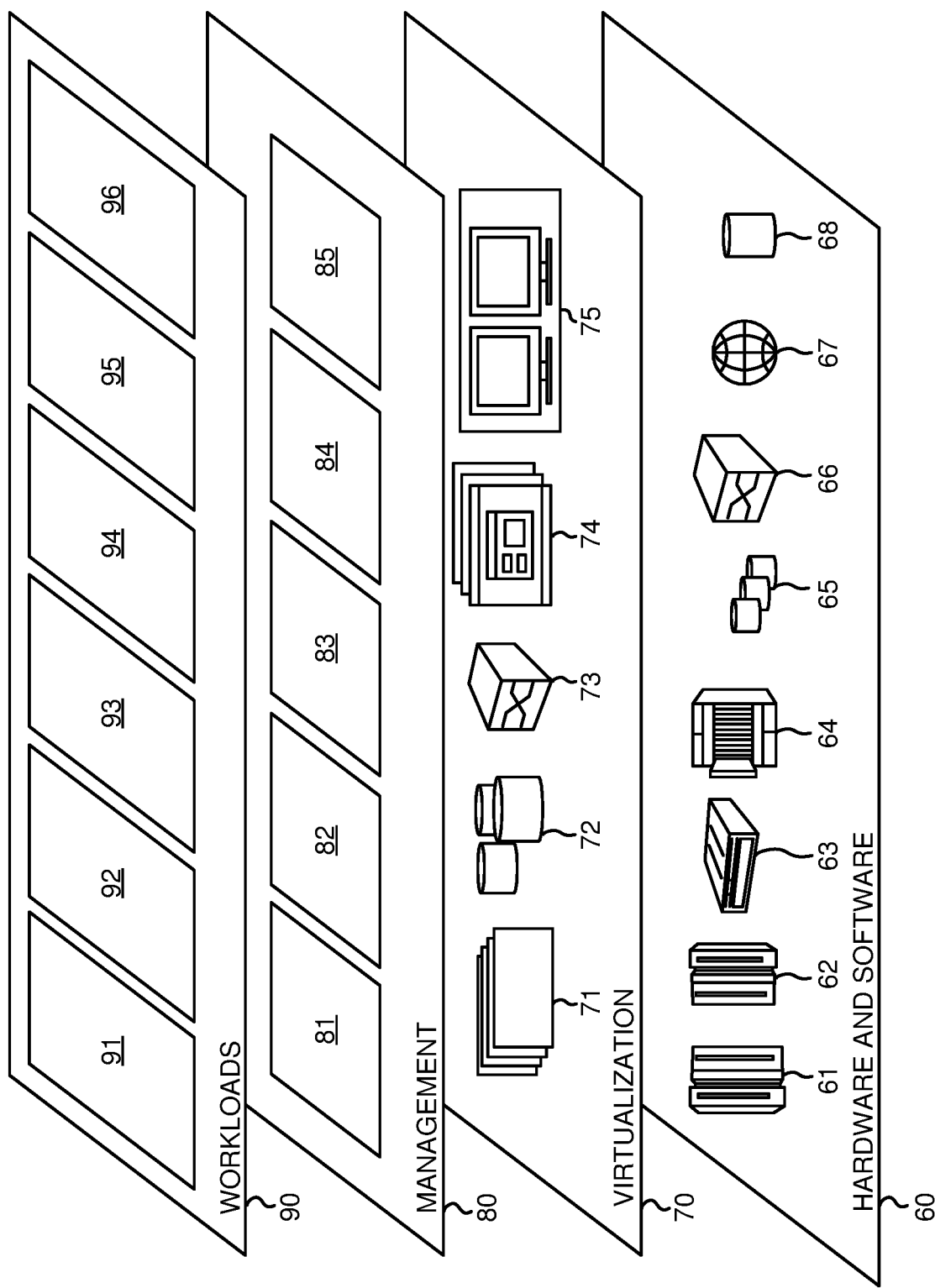
FIG. 10 depicts abstraction model layers, in accordance with some embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensitive information masking 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any portion of the method described with respect to FIGS. 3-7 and/or implement any portion of the functionality discussed in FIGS. 1-2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes identifying sensitive information in first audio data from a first client device; generating second audio data including hashed sensitive information, wherein the hashed sensitive information comprises an audio clip that replaces the sensitive information and that is based on the sensitive information; transmitting the second audio data including the hashed sensitive information to a second client device; receiving third audio data including the hashed sensitive information from the second client device; generating fourth audio data by replacing the hashed sensitive information with the sensitive information; and transmitting the fourth audio data including the sensitive information to the first client device.

Example 2 includes the method of example 1, including or excluding optional features. In this example, identifying the sensitive information in the first audio data further comprises: comparing extracted portions of the first audio data to a sensitive information database; and classifying respective extracted portions matching a respective entry in the sensitive information database as the sensitive information.

Example 3 includes the method of any one of examples 1 to 2, including or excluding optional features. In this example, identifying the sensitive information in the first audio data further comprises: generating a sensitivity score for an extracted portion of the first audio data; determining that the sensitivity score satisfies a sensitivity score threshold; and classifying the extracted portion of the first audio data as the sensitive information. Optionally, the sensitivity score is generated by a content sensitivity model that is trained using machine learning algorithms.

Example 4 includes the method of any one of examples 1 to 3, including or excluding optional features. In this example, generating the second audio data including the hashed sensitive information further comprises storing a correspondence between the sensitive information and the hashed sensitive information in a mapping table; and wherein generating fourth audio data by replacing the hashed sensitive information with the sensitive information further comprises matching the hashed sensitive information with the sensitive information based on the correspondence in the mapping table.

Example 5 includes the method of any one of examples 1 to 4, including or excluding optional features. In this example, the hashed sensitive information includes an indicator that identifies the hashed sensitive information as data with a sensitive information classification. Optionally, the indicator further includes an explanation of the sensitive information classification, wherein the explanation relates to at least one selected from a first group consisting of: a match in a sensitive information database, and a sensitivity score generated by a sensitivity score model above a sensitivity score threshold. Optionally, the method further comprises: receiving feedback related to an accuracy of the sensitive information classification; and updating, based on the feedback, at least one selected from a second group consisting of: the sensitive information database, the sensitivity score threshold, and the sensitivity score model.

Example 6 includes the method of any one of examples 1 to 5, including or excluding optional features. In this example, the method is performed by a data security application according to software that is downloaded to the data security application from a remote data processing system. Optionally, the method further comprises: metering a usage of the software; and generating an invoice based on metering the usage.

Example 7 is a system. The system includes one or more processors; and one or more computer-readable storage media storing program instructions which, when executed by the one or more processors, are configured to cause the one or more processors to perform a method according to any of examples 1-6.

Example 8 is a computer program product. The computer program product includes one or more computer readable storage media, and program instructions collectively stored on the one or more computer readable storage media, the program instructions comprising instructions configured to cause one or more processors to perform a method according to any of Examples 1-6.

What is claimed is:

1. A computer-implemented method comprising:
    identifying sensitive information in first audio data from a first client device;
    generating second audio data including hashed sensitive information, wherein the hashed sensitive information comprises an audio clip that replaces the sensitive information, that is based on the sensitive information, and that retains linguistic characteristics of the sensitive information, wherein the linguistic characteristics are selected from a group consisting of:
    phonetic characteristics, syntactic characteristics, and semantic characteristics;
    transmitting the second audio data including the hashed sensitive information to a second client device;
    receiving third audio data including the hashed sensitive information from the second client device;
    generating fourth audio data by replacing the hashed sensitive information with the sensitive information; and
    transmitting the fourth audio data including the sensitive information to the first client device.

2. The method of claim 1, wherein identifying the sensitive information in the first audio data further comprises:
    comparing extracted portions of the first audio data to a sensitive information database; and
    classifying respective extracted portions matching a respective entry in the sensitive information database as the sensitive information.

3. The method of claim 1, wherein identifying the sensitive information in the first audio data further comprises:
    determining that an extracted portion of the first audio data does not match any record in a sensitive information database;
    generating a sensitivity score for the extracted portion of the first audio data in response to determining that the extracted portion of the first audio data does not match any record in the sensitive information database;
    determining that the sensitivity score satisfies a sensitivity score threshold; and
    classifying the extracted portion of the first audio data as the sensitive information.

4. The method of claim 3, wherein the sensitivity score is generated by a content sensitivity model that is trained using machine learning algorithms.

5. The method of claim 1, wherein generating the second audio data including the hashed sensitive information further comprises storing a correspondence between the sensitive information and the hashed sensitive information in a mapping table; and
    wherein generating fourth audio data by replacing the hashed sensitive information with the sensitive information further comprises matching the hashed sensitive information with the sensitive information based on the correspondence in the mapping table.

6. The method of claim 1, wherein the hashed sensitive information includes an indicator that identifies the hashed sensitive information as data with a sensitive information classification.

7. The method of claim 6, wherein the indicator further includes an explanation of the sensitive information classification, wherein the explanation relates to a match in a sensitive information database.

8. The method of claim 7, wherein the method further comprises:
receiving feedback related to an accuracy of the sensitive information classification; and
updating, based on the feedback, the sensitive information database.

9. The method of claim 6, wherein the indicator further includes an explanation of the sensitive information classification, wherein the explanation relates to a sensitivity score generated by a sensitivity score model above a sensitivity score threshold.

10. The method of claim 9, wherein the method further comprises:
receiving feedback related to an accuracy of the sensitive information classification; and
updating, based on the feedback, the sensitivity score model.

11. The computer-implemented method of claim 1, wherein the method is performed by a data security application according to software that is downloaded to the data security application from a remote data processing system.

12. The computer-implemented method of claim 11, wherein the method further comprises:
metering a usage of the software; and
generating an invoice based on metering the usage.

13. The method of claim 1, wherein the linguistic characteristics comprise the phonetic characteristics.

14. The method of claim 1, wherein the linguistic characteristics comprise the syntactic characteristics.

15. The method of claim 1, wherein the linguistic characteristics comprise the semantic characteristics.

16. A system comprising:
one or more processors; and
one or more computer-readable storage media storing program instructions which, when executed by the one or more processors, are configured to cause the one or more processors to perform a method comprising:
identifying sensitive information in first audio data from a first client device;
generating second audio data including hashed sensitive information, wherein the hashed sensitive information comprises an audio clip that replaces the sensitive information, that is based on the sensitive information, and that retains linguistic characteristics of the sensitive information, wherein the linguistic characteristics are selected from a group consisting of:
phonetic characteristics, syntactic characteristics, and semantic characteristics;
transmitting the second audio data including the hashed sensitive information to a second client device;
receiving third audio data including the hashed sensitive information from the second client device;
generating fourth audio data by replacing the hashed sensitive information with the sensitive information; and
transmitting the fourth audio data including the sensitive information to the first client device.

17. The system of claim 16, wherein identifying the sensitive information in the first audio data further comprises:
comparing extracted portions of the first audio data to a sensitive information database; and
classifying respective extracted portions matching a respective entry in the sensitive information database as the sensitive information.

18. The system of claim 16, wherein identifying the sensitive information in the first audio data further comprises:
determining that an extracted portion of the first audio data does not match any record in a sensitive information database;
generating, in response to determining that the extracted portion of the first audio data does not match any record in the sensitive information database, a sensitivity score for the extracted portion of the first audio data based on inputting the extracted portion of the first audio data to a content sensitivity model that is trained using machine learning algorithms;
determining that the sensitivity score satisfies a sensitivity score threshold; and
classifying the extracted portion of the first audio data as the sensitive information.

19. The system of claim 16, wherein generating the second audio data including the hashed sensitive information further comprises storing a correspondence between the sensitive information and the hashed sensitive information in a mapping table; and
wherein generating fourth audio data by replacing the hashed sensitive information with the sensitive information further comprises matching the hashed sensitive information with the sensitive information based on the correspondence in the mapping table.

20. A computer program product comprising one or more computer readable storage media, and program instructions collectively stored on the one or more computer readable storage media, the program instructions comprising instructions configured to cause one or more processors to perform a method comprising:
identifying sensitive information in first audio data from a first client device;
generating second audio data including hashed sensitive information, wherein the hashed sensitive information comprises an audio clip that replaces the sensitive information, that is based on the sensitive information, and that retains linguistic characteristics of the sensitive information, wherein the linguistic characteristics are selected from a group consisting of:
phonetic characteristics, syntactic characteristics, and semantic characteristics;
transmitting the second audio data including the hashed sensitive information to a second client device;
receiving third audio data including the hashed sensitive information from the second client device;
generating fourth audio data by replacing the hashed sensitive information with the sensitive information; and
transmitting the fourth audio data including the sensitive information to the first client device.

* * * * *